United States Patent Office 3,388,108
Patented June 11, 1968

3,388,108
RUBBER VULCANIZATES AND THEIR PREPARATION
George E. P. Smith, Jr., Akron, Ohio, assignor to The Firestone Tire & Rubber Company, Akron, Ohio, a corporation of Ohio
No Drawing. Filed Apr. 1, 1966, Ser. No. 539,324
14 Claims. (Cl. 260—79.5)

This application relates to substituted thioformyl derivatives of 2-mercaptoarylene thiazoles and N,N-di(hydrocarbon) substituted dithiocarbamates as accelerators of the sulfur vulcanization of vulcanizable diolefin rubbers, namely, natural rubber and diolefin synthetic rubbers vulcanizable by heating with sulfur, including polybutadiene, polyisoprene, various copolymers of conjugated diolefins and vinyl compounds, such as SBR (copolymer of butadiene and styrene) and NBR (copolymer of butadiene and acrylonitrile), copolymers of butadiene or isoprene with alpha-methylstyrene, ring-substituted styrenes, chloromethyl styrene, etc., butadieneisoprene copolymer, isobutylene-isoprene, butadiene-vinylpyridine copolymers and terpolymers, EPDM rubbers (terpolymers of ethylene, propylene and a non-conjugated diolefin, e.g. dicyclopentadiene), such rubbers also being known as "EPT" or ethylene-propylene terpolymers.

The new compounds are represented by the formula $$X-S-\overset{O}{\underset{\|}{C}}-S-R$$

in which X is is from the class consisting of thiocarbamyl and arylenethiazole radicals and in which R is a radical from the class consisting of (1) straight- and branched-chain and cyclic alkyl groups of 1 to 12 carbon atoms and (2) phenyl and naphthyl and lower straight- and branched-chain alkyl derivatives thereof in which the one or more alkyl groups each contain 1 to 4 carbon atoms. The thiocarbamyl radicals are represented by the formula

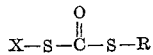

in which $R_1$ and $R_2$ (which may be the same or different) are selected from the class consisting of (1) straight- and branched-chain alkyl groups of 1 to 4 carbon atoms, (2) cycloalkyl groups of 5 to 7 carbon atoms, (3) phenyl and naphthyl and lower straight- and branched-chain alkyl derivatives thereof in which the alkyl group contains 1 to 4 carbon atoms, and (4) $R_1$ and $R_2$ may form the cyclic group,

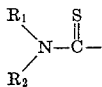

containing 4 to 6 carbon atoms. In the arylenethiazole radical the arylene group is selected from the class consisting of benzo and naphtho groups, both unsubstituted and substituted derivatives thereof in which the one or more substituents are selected from the class consisting of phenyl and straight-chain and branched-chain alkyl groups of 1 to 8 carbon atoms.

The new compounds are conveniently derived from an alkyl or aryl chlorothioformate of the formula

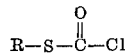

in which R is selected from the class consisting of (1) straight- and branched-chain and cyclic alkyl groups of 1 to 12 carbon atoms and (2) phenyl and naphthyl and lower alkyl derivatives thereof in which the alkyl group contains 1 to 4 carbon atoms. Such a chlorothioformate is reacted with (1) a 2-mercaptoarylenethiazole or substituted-2-mercaptoarylenethiazole in which the substituent is phenyl or a straight-chain or branched-chain alkyl group of 1 to 8 carbon atoms, including 2-mercapto-6-methylbenzothiazole
2-mercapto-6-butylbenzothiazole
2-mercapto-4-methylbenzothiazole
2-mercapto-5-methylbenzothiazole
2-mercapto-6-octylbenzothiazole
2-mercapto-7-methylbenzothiazole
2-mercapto-4,6-dimethylbenzothiazole
2-mercapto-5,6-diethylbenzothiazole
2-mercapto-4-phenylbenzothiazole
2-mercapto-6-phenylbenzothiazole
2-mercaptonaphthothiazole
2-mercapto-5-methylnaphthobenzothiazole
2-mercapto-6-butylnaphthobenzothiazole and (2) a dithiocarbamate of the formula

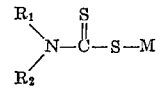

in which M is a metal from the group of alkali and alkaline earth metals and $R_1$ and $R_2$ are both branched- or straight-chain alkyl groups of 1 to 4 carbon atoms or cyclic alkyl groups of 5 to 7 carbon atoms, and may be the same or different, or an aryl group such as phenyl or naphthyl or a lower alkyl derivative thereof in which the alkyl group contains 1 to 4 carbon atoms, and $R_1$ and $R_2$ may form a cyclic group, viz.

containing 4 to 6 carbon atoms, such as sodium N,N-dimethyldithiocarbamate
sodium N-methyl-N-ethyldithiocarbamate
sodium N,N-diethyldithiocarbamate
sodium N,N-diisopropyldithiocarbamate
sodium N,N-di-n-propyldithiocarbamate
sodium N,N-di-n-butyldithiocarbamate
lithium N-cyclopentamethylenedithiocarbamate
potassium N-cyclohexamethylenedithiocarbamate
calcium N-methyl-N-isopropyldithiocarbamate
sodium N-methyl-N-phenyldithiocarbamate
sodium N-isopropyl-N-cyclohexyldithiocarbamate
lithium N-methyl-N-p-tolyldithiocarbamate Representative compounds are:

S-phenylthioformyl-N,N-dimethyldithiocarbamate
S-beta-naphthylthioformyl-N,N-dimethyldithiocarbamate S-phenylthioformyl-N,N-diisobutyldithiocarbamate
S-phenylthioformyl-N-isopropyl-N-cyclohexyldithiocarbamate
S-phenylthioformyl-N-cyclopentamethylenedithiocarbamate
S-methylthioformyl-N-cyclopentamethylenedithiocarbamate
S-p-tolylthioformyl-N,N-dimethyldithiocarbamate
S-m-tolylthioformyl-N,N-dimethyldithiocarbamate
S-o-tolylthioformyl-N,N-dimethyldithiocarbamate
S-p-(t-butylphenyl)thioformyl-N,N-diethyldithiocarbamate
S-beta-naphthylthioformyl-2-thiobenzothiazole
S-phenylthioformyl-2-thiobenzothiazole
S-octylthioformyl-2-thiobenzothiazole
S-ethylthioformyl-2-thio-6-methylbenzothiazole
S-beta-naphthylthioformyl-2-thio-6-t-butylbenzothiazole
S-amylthioformyl-2-thio-5-methylbenzothiazole
S-phenylthioformyl-2-thio-6-octylbenzothiazole
S-methylthioformyl-2-thionaphthothiazole
S-phenylthioformyl-2-thionaphthothiazole Other accelerators may be similarly produced from substituted 2-mercaptothiazoles, such as, for example:

4-methyl-2-mercaptothiazole
4,5-dimethyl-2-mercaptothiazole
4-methyl-5-ethyl-2-mercaptothiazole
4-ethyl-2-mercaptothiazole
4,5-di-n-butyl-2-mercaptothiazole and from thiazolines, such as, for example:

4-methyl-2-mercaptothiazoline
4,5-dimethyl-2-mercaptothiazoline
4-ethyl-2-mercaptothiazoline
4-octyl-2-mercaptothiazoline
4-methyl-5-ethyl-2-mercaptothiazoline
4,5-di-n-butyl-2-mercaptothiazoline The compounds of this invention are prepared by reacting the appropriate halothioformate with the metal salts of the dithiocarbamates and the 2-mercaptoarylenethiazoles. The halothioformate and the metal salts are mixed and reacted at about room temperature and the products isolated by any suitable methods.

In preparing the compounds, the alkali or alkaline earth metal dithiocarbamates are prepared in the usual manner by the reaction of the appropriate amine with carbon disulfide and an alkali metal hydroxide at a usual temperature; the halothioformate is then added in any usual manner, as by dropwise addition to the salt in an equilmolecular amount with stirring at approximately 0° C., splitting out the metal halide and forming the dithiocarbamate esters. In preparing the mercaptoarylenethiozole derivatives the halothioformate is added to a mercaptoarylenethiazole salt.

The following examples are illustrative:

Example 1.—S-phenylthioformyl-N,N-dimethyldithiocarbamate

This compound was prepared by the reaction of dimethylamine, carbon disulfide and sodium hydroxide in 200 ml. of water, followed by the addition of phenyl chlorothioformate. The solid isolated melted at 86–88° C.; yield, 91 percent. The infrared spectrum in chloroform showed a sharp, strong band at $5.80\mu$ (carbonyl), $6.10\mu$ (aromatic C=C) and $6.80\mu$ (C—N). The elemental analysis was in agreement with the calculated values.

Analysis.—Calcd. for $C_{10}H_{11}NOS_3$: C, 46.62; H, 4.30; N, 5.44; S, 37.37. Found: C, 46.37; H, 4.49; N, 5.48; S, 37.32.

Example 2.—S-phenylthioformyl-N,N-diisobutyldithiocarbamate

This compound was prepared by the reaction of diisobutylamine with carbon disulfide in aqueous sodium hydroxide solution followed by the addition of phenyl chlorothioformate. The solid obtained melted at 66–70° C. and was isolated in 90 percent yield. The infrared spectrum of this material showed strong absorption bands at $5.80\mu$ (carbonyl); $6.20\mu$ (aromatic C=C). Furthermore, its elemental analysis was in agreement with the calculated values.

Analysis.—Calcd. for $C_{16}H_{23}NOS_3$: C, 56.26; H, 6.78; N, 4.10; S, 28.15. Found: C, 56.32; H, 7.00; N, 4.19; S, 28.17.

Example 3.—S-phenylthioformyl-N-cyclopentamethylenedithiocarbamate

This compound was prepared by the reaction of piperidine in aqueous sodium hydroxide with carbon disulfide. To this reaction mixture was added phenyl chlorothioformate at below 0° C. On workup, the product was an oil. The yield was not determined, but the infrared spectrum of this material was consistent with the postulated structure. It showed characteristic bands at $5.80\mu$ (carbonyl), $6.20\mu$ (aromatic C=C and $6.80\mu$ (C—N).

Example 4.—S-methylthioformyl-N-cyclopentamethylenedithiocarbamate

This compound was prepared by the reaction of piperidine in aqueous sodium hydroxide with carbon disulfide and adding methyl chlorothioformate to this reaction mixture at below 0° C. An oil was obtained which showed an infrared spectrum consistent with the structure of S-methylthioformyl - N - cyclopentamethylenedithiocarbamate, i.e., band at $5.80\mu$ (carbonyl), $6.20\mu$ (aromatic C=C) and $6.80\mu$ (C—N).

Example 5.—S-phenylthioformyl-2-mercaptobenzothiazole

The sodium salt of 2-mercaptobenzothiazole was made by reaction of 2-mercaptobenzothiazole with sodium hydroxide in ethanol at about 0° C. This was reacted with chlorophenylthioformate in equimolecular amounts at about room temperature. The product showed strong absorption bands at $6.05\mu$ (carbonyl) and aromatic bands at $13.5\mu$ and $14.20\mu$. The melting point was 88–89° C. and the yield 98 percent. NMR spectra showed two types of aromatic protons at 7.30 p.p.m. and 7.0 p.p.m.

Example 6.—S-methylthioformyl-2-mercaptobenzothiazole

S-methylthioformyl-2-mercaptobenzothiazole was prepared by the reaction of chloromethylthioformate and sodium-2-mercaptobenzothiazole in ethanol at about room temperature. The infrared spectrum showed a strong absorption peak at $6.02\mu$ (carbonyl). The melting point was 64–66° C. and the yield 85 percent.

The value of these compounds as accelerators of the sulfur vulcanization of diolefin rubbers is illustrated by the following examples of the vulcanization of butadiene-styrene rubber with the following accelerators:

Test 1.—S-phenylthioformyl-N,N-dimetyhlditho-carbamate

Test 2.—S-phenylthioformyl-N,N-diisobutyldithiocarbamate

Test 3.—S-methylthioformyl-N-cyclopentamethylenedithiocarbamate

The compounds were tested as accelerators, utilizing the following tire tread masterbatch:

| | Parts by weight |
|---|---|
| Emulsion-polymerized SBR | 100 |
| HAF Black | 50 |
| Zinc oxide | 3 |
| Stearic acid | 2 |
| Phenyl-beta-naphthylamine | 0.6 |
| Oil | 8 |
| | 163.6 |

Sulfur and the test accelerators were added, and the samples were cured at 300° F. for 20 and 40 minutes, with results shown in the following table where modulus and tensile strength are recorded in pounds per square inch and elongation in percent.

TABLE I

|  | Test 1 | Test 2 | Test 3 |
|---|---|---|---|
| Masterbatch | 163.6 | 163.6 | 163.6 |
| Sulfur | 2 | 2 | 2 |
| Accelerator | 1.2 | 1.2 | 1.2 |
|  | 166.8 | 166.8 | 166.8 |
| Mooney Scorch at 265° F.: |  |  |  |
| Ts (Vm+1) | 9 | 16 | 9 |
| Tc (Vm+10) | 14.5 | 24 | 13 |
| Vm | 24.5 | 23 | 24.5 |
| Physical Properties: |  |  |  |
| 300% Modulus, p.s.i.: |  |  |  |
| Cure: |  |  |  |
| 20' | 2,750 | 1,650 | 2,325 |
| 40' | 3,050 | 2,200 | 2,550 |
| Tensile Strength, p.s.i.: |  |  |  |
| Cure: |  |  |  |
| 20' | 3,575 | 3,775 | 3,950 |
| 40' | 3,175 | 3,800 | 3,700 |
| Elongation, percent: |  |  |  |
| Cure: |  |  |  |
| 20' | 350 | 510 | 430 |
| 40' | 310 | 430 | 380 |

In further tests, using phenylthioformyl-2-mercaptobenzothiazole and methylthioformyl-2-mercaptobenzothiazole in the same SBR stock, a delayed-action, effective cure was obtained at 340° F. The tests were made with the following accelerators, with results reported in the following tables.

Tests 4 and 5.—S-phenylthioformyl-2-mercaptobenzothiazole
Test 6.—S-methylthioformyl-2-mercaptobenzothiazole Tests 4 and 5 use the same accelerator, but the times of cure are slightly different.

TABLE II

|  | Test 4 |
|---|---|
| Masterbatch | 163.6 |
| Sulfur | 2 |
| Accelerator | 1.2 |
|  | 166.8 |
| Mooney Scorch at 265° F.: |  |
| Ts (Vm+1) | 40 |
| Tc (Vm+10) | >40 |
| Vm | 21 |
| Physical Properties: |  |
| 300% Modulus, p.s.i.: |  |
| Cure |  |
| 12' | 650 |
| 24' | 1,075 |
| 48' | 1,300 |
| 400% Modulus, p.s.i.: |  |
| Cure: |  |
| 12' | 1,100 |
| 24' | 1,750 |
| 48' | 2,075 |
| Tensile Strength, p.s.i.: |  |
| Cure: |  |
| 12' | 2,250 |
| 24' | 3,150 |
| 48' | 3,250 |
| Elongation, percent: |  |
| Cure: |  |
| 12' | 680 |
| 24' | 600 |
| 48' | 540 |

TABLE III

|  | Test 5 | Test 6 |
|---|---|---|
| Masterbatch | 163.6 | 163.6 |
| Sulfur | 2 | 2 |
| Accelerator | 1.2 | 1.2 |
|  | 166.8 | 166.8 |
| Mooney Scorch at 265° F.: |  |  |
| Ts (Vm+1) | 34.5 | 36 |
| Tc (Vm+10) | >40 | >40 |
| Vm | 21 | 21 |
| Physical Properties: |  |  |
| 300% Modulus, p.s.i.: |  |  |
| Cure: |  |  |
| 15' | 800 | 800 |
| 30' | 1,100 | 1,100 |
| 45' | 1,250 | 1,250 |
| 400% Modulus, p.s.i.: |  |  |
| Cure: |  |  |
| 15' | 1,400 | 1,400 |
| 30' | 1,850 | 1,825 |
| 45' | 2,025 | 2,000 |
| Tensile Strength, p.s.i.: |  |  |
| Cure: |  |  |
| 15' | 2,975 | 2,850 |
| 30' | 3,250 | 3,300 |
| 45' | 3,275 | 3,150 |
| Elongation, percent: |  |  |
| Cure: |  |  |
| 15' | 700 | 700 |
| 30' | 580 | 640 |
| 45' | 560 | 580 |

The above data show that the thioformyl derivatives of both of the dithiocarbamic acids of the 2-mercaptoarylenethiazoles are active accelerators. The dithiocarbamates are faster accelerators, very active at 300° F., and even at lower vulcanizing temperatures, whereas the 2-mercaptoarylenethiazoles are active accelerators with excellent delayed action at higher vulcanization temperatures, e.g. at 340° F.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur.

One or more accelerator activator is often used with any of the accelerators mentioned, and such activators include the various derivatives of guanidine known in the rubber art, amine salts of inorganic and organic acids, various amines themselves, alkaline salts such as sodium acetate, sodium sulfite and the like, as well as other activators known to the art. Additionally, two or more accelerators or accelerator combinations are sometimes desirable in a single rubber compound.

Many of the accelerators of the invention are suitable for use in latex formulations, especially the thioformyl derivatives of the dithiocarbamic acids which are more active at lower vulcanization temperatures.

Although valcanization is usually accomplished by heating a vulcanizable rubber composition at a temperature in the range of 240 to 400° F. for a time ranging from several hours to a few seconds, vulcanization of a suitably activated rubber composition does take place at lower temperatures such as at room temperature. For example, a latex film containing a sulfur curing agent and an activated ultra accelerator can be cured by allowing the film to remain at room temperature for several hours or a few days.

Any suitable amount of the accelerator will be used, depending upon the rubber and the use to which the rubber is to be put. A range of 0.1 to 10 parts of the accelerator to 100 parts of the rubber is within the scope of the invention, a preferred range being 0.5 to 5 parts of the accelerator.

Any combination or blend of known sulfur vulcanizable rubbers can be used in the invention, and oil-extended rubbers or blends can also be used. Any known filler or reinforcing pigment or any combination of these can be used at any desired level as is well known in the rubber art.

I claim:
1. A vulcanizable composition comprising a sulfur vulcanizable diolefin rubber, sulfur and between 0.1 and 10 parts per 100 parts of the rubber of a thioformyl compound having the formula

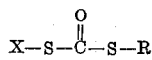

in which R is a radical from the class consisting of
  (1) straight-chain and branched-chain and cyclic alkyl groups of 1 to 12 carbon atoms, and
  (2) phenyl and naphthyl and lower straight-chain and branched-chain alkyl derivatives thereof in which the one or more alkyl groups each contain 1 to 4 carbon atoms;
and in which X is selected from the class consisting of
  (a) thiocarbamyl radicals having the formula

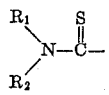

in which $R_1$ and $R_2$ are from the class consisting of
    (1) straight-chain and branched-chain alkyl groups of 1 to 4 carbon atoms,
    (2) cycloalkyl groups of 5 to 7 carbon atoms,
    (3) phenyl and naphthyl and straight-chain and branched-chain alkyl derivatives thereof in which the alkyl group contains 1 to 4 carbon atoms, and
    (4) $R_1$ and $R_2$ may form the cyclic group

containing 4 to 6 carbon atoms; and
  (b) arylenethiazole radicals in which the arylene group is selected from the class consisting of benzo and naphtho groups, both unsubstituted and substituted derivatives thereof in which the one or more substituents are selected from the class consisting of phenyl and straight-chain and branched-chain alkyl groups of 1 to 8 carbon atoms.
2. The composition of claim 1 in which the rubber comprises butadiene-styrene copolymer.

3. The composition of claim 1 which the accelerator is S-phenylthioformyl-N,N-dimethyldithiocarbamate.
4. The composition of claim 1 in which the accelerator is S-phenylthioformyl-N,N-diisobutyldithiocarbamate.
5. The composition of claim 1 in which the accelerator is S-methylthioformyl-N-cyclopentamethylenedithiocarbamate.
6. The composition of claim 1 in which the accelerator is S-phenylthioformyl-2-mercaptobenzothiazole.
7. The composition of claim 1 in which the accelerator is S-methylthioformyl-2-mercaptobenzothiazole.
8. The method of producing a vulcanizate which comprises heating the composition of claim 1.
9. The method of producing a vulcanizate which comprises heating the composition of claim 2.
10. The method of producing a vulcanizate which comprises heating the composition of claim 1 in which the thioformyl compound is S-phenylthioformyl-N,N-dimethylithiocarbamate.
11. The method of producing a vulcanizate which comprises heating the composition of claim 1 in which the thioformyl compound is S-phenylthioformyl-N,N-diisobutylthiocarbamate.
12. The method of producing a vulcanizate which comprises heating the composition of claim 1 in which the thioformyl compound is S-methylthioformyl-N-cyclopentamethylenedithiocarbamate.
13. The method of producing a vulcanizate which comprises heating the composition of claim 1 in which the thioformyl compound is S-phenylthioformyl-2-mercaptobenzothiazole.
14. The method of producing a vulcanizate which comprises heating the composition of claim 1 in which the thioformyl compound is S-methylthioformyl-2-mercaptobenzothiazole.

References Cited
UNITED STATES PATENTS

| | | | |
|---|---|---|---|
| 2,440,991 | 5/1948 | Wayo | 260—455 |
| 2,886,593 | 5/1959 | Louthan et. al. | 260—455 |
| 3,151,114 | 9/1964 | D'Amico et al. | 260—79.5 |

JOSEPH L. SCHOFER, *Primary Examiner.*

D. K. DENENBERG, *Assistant Examiner.*